United States Patent
Suzuki et al.

[11] Patent Number: 6,135,192
[45] Date of Patent: Oct. 24, 2000

[54] BLIND DEVICE

[75] Inventors: Ken Suzuki; Masaru Inoue; Ichiro Sasuga, all of Kanagawa, Japan

[73] Assignee: NHK Spring Co., Ltd., Kanagawa, Japan

[21] Appl. No.: 09/341,657

[22] PCT Filed: Jan. 16, 1998

[86] PCT No.: PCT/JP90/00141

§ 371 Date: Aug. 30, 1999

§ 102(e) Date: Aug. 30, 1999

[87] PCT Pub. No.: WO98/31913

PCT Pub. Date: Jul. 23, 1998

[30] Foreign Application Priority Data

Jan. 16, 1997 [JP] Japan ..................................... 9-017819

[51] Int. Cl.[7] ........................................................ B60J 3/00
[52] U.S. Cl. ................... 160/370.22; 160/265; 160/242; 160/295
[58] Field of Search .............................. 160/370.22, 310, 160/265, 295, 242, 249; 296/97.8

[56] References Cited

U.S. PATENT DOCUMENTS

| | | |
|---|---|---|
| 4,836,263 | 6/1989 | Ament . |
| 5,615,729 | 4/1997 | Matsumoto et al. ............... 160/370.22 |
| 5,653,278 | 8/1997 | Cheng ................................. 160/370.22 |
| 5,752,560 | 5/1998 | Cherng ............................... 160/370.22 |
| 5,791,721 | 8/1998 | Lin ..................................... 160/370.22 |
| 5,896,910 | 4/1999 | Chen ................................... 160/370.22 |

FOREIGN PATENT DOCUMENTS

| | | |
|---|---|---|
| 54-5566 | 3/1979 | Japan . |
| 62-244995 | 10/1987 | Japan . |
| 6-221072 | 8/1994 | Japan . |
| 8-246767 | 9/1996 | Japan . |
| 3033518 U | 1/1997 | Japan . |
| 3042822 U | 11/1997 | Japan . |

OTHER PUBLICATIONS

Patent Abstracts of Japan; Publication No. 06221072, Aug. 9, 1994; Appln. No. 05029753 filed Jan. 26, 1993; "Electric Blind Position Adjusting Device"; Nichibei Co., Ltd.; Yukinori et al.

Patent Abstracts of Japan; Publication No. 08246767, Sep. 24, 1996; Appln. No. 07087809 filed Mar. 7, 1995; "Automatic Lifting Gear of Blind"; Hirata Yoshio.

*Primary Examiner*—Blair M. Johnson
*Attorney, Agent, or Firm*—Marshall & Melhorn

[57] ABSTRACT

In a blind device, comprising a fixed frame 1, at least a pair of arms 5 each having an end pivotally attached to the fixed frame, a moveable frame 4 which is adapted to move toward and away from the fixed frame in a parallel relationship by rotational movements of the two arms, and a light-shielding screen 3 having one end fixedly attached to and wound around a roll 2 which is pivotally supported by the fixed frame, and another end fixedly attached to the moveable frame, characterized by that; a pivot shaft for pivotally supporting each arm on the fixed frame is incorporated with spring means 16 which resiliently urges the corresponding arm toward its upright position, and the blind device further comprises an electric actuator 17 having reverse drive preventing means for applying a rotative force to the roll so as to wind the screen thereon against a spring force of the spring means. Thus, the resilient force of the spring means applies a moment to the arms to urge it toward their upright positions, and the torque of the electric actuator winds the screen onto the roll. Because the electric actuator would not be reverse driven, once the electric actuator is stopped, the screen is kept stationary with a desired length thereof pulled out. Furthermore, because the resilient force of the spring means is always applied to the arms, the screen would not slack at any extended position. Also, by controlling the rotational speed of the electric motor, the speed of paying out and winding the screen can be controlled in a stable fashion.

6 Claims, 11 Drawing Sheets

BLIND DEVICE

TECHNICAL FIELD

The present invention relates to a blind device adapted to be mounted on a rear window of an automobile or a window of a building for shielding light, and in particular to a blind device which shields light by paying out a screen wound on a roll.

BACKGROUND OF THE INVENTION

U.S. Pat. No. 4,836,263 discloses an automotive screen device for shielding light in which spring means applies a biasing force to a roll having a light shielding screen wound thereon in a direction to wind up the roll, and an electric actuator or a hydraulic actuator applies an extending force to the light shielding screen via rotatable arms.

In this case, because the rotative force applied to the roll and the tension applied to the light shielding screen are not properly coordinated with each other, if either one of them is lost, the light shielding screen may be subjected to an excessive tension or may produce a slack. Furthermore, if the rotational angles of the rotary arms do not synchronize with each other, uneven tension may be applied to the screen and the screen may be creased or the smooth movement of the screen may become impossible. Therefore, mechanical means is required for synchronizing the rotary motions of the two arms, and this tends to complicate the structure.

In the case of a drive unit using an electric motor, the stop control of the motor is carried out by monitoring the electric current of the electric motor when the driven member has reached an end of the stroke of its movement. As this involves the detection of an over-current as a signal for stopping the electric motor, circuits for comparing and computing electric current levels are required, and the control device tends to be undesirably expensive. Furthermore, an over-current condition is necessarily produced immediately before stopping the electric motor, and this may reduce the durability of the electric motor.

In view of such problems of the prior art, a primary object of the present invention is to provide a blind device which can be stop controlled independently from the load of the electric motor, and which can prevent any excessive tension from being applied to the screen or any creases from being produced in the screen with a simple structure.

BRIEF SUMMARY OF THE INVENTION

Such an object can be accomplished by providing a blind device as set forth in claim 1, or a blind device, comprising a fixed frame, at least a pair of arms each having an end pivotally attached to the fixed frame, a moveable frame which is adapted to move toward and away from the fixed frame in a parallel relationship by rotational movements of the two arms, and a light-shielding screen having one end fixedly attached to and wound around a roll which is pivotally supported by the fixed frame, and another end fixedly attached to the moveable frame, characterized by that; a pivot shaft for pivotally supporting each arm on the fixed frame is incorporated with spring means which resiliently urges the corresponding arm toward its upright position, and the blind device further comprises an electric actuator having reverse drive preventing means for applying a rotative force to the roll so as to wind the screen thereon against a spring force of the spring means.

Thus, the resilient force of the spring means applies a moment to the arms to urge it toward their upright positions, and the torque of the electric actuator winds the screen onto the roll. Because the electric actuator would not be reverse driven, once the electric actuator is stopped, the screen is kept stationary with a desired length thereof pulled out. Furthermore, because the resilient force of the spring means is always applied to the arms, the screen would not slack at any extended position. Also, by controlling the rotational speed of the electric motor, the speed of paying out and winding the screen can be controlled in a stable fashion.

If the blind device further comprises a male thread shaft which is rotatable jointly with a rotary shaft of the electric actuator, an axially moveable member having rotation preventing means for keeping the axially moveable member rotationally fast, and threadably engaging the male thread shaft, and switch means for detecting a displacement of the axially moveable member along the male thread shaft as set forth in claim 2, because the rotational angle of the electric actuator can be converted into an axial displacement of the axially moveable member, it is possible to control the extending length of the screen according to the revolution of the electric actuator by providing a limit switch which can be operated by the axially moveable member. Furthermore, if a striker for actuating the switch means is attached to the axially moveable member via axial distance adjusting means as set forth in claim 3, the paid out length of the screen can be selected at will according to the relative positioning of the striker and the switch means. Additionally, if spring means is interposed between the axially moveable member and the striker to urge them in a prescribed direction as set forth in claim 4, a play due to dimensional errors that may exist in the thread engagement can be removed, and the stop position can be even more precisely defined.

If each of the two arms comprises a lower arm having one end pivotally attached to the fixed frame, and an upper arm having one end pivotally attached to the moveable frame, other ends of the lower and upper arms being pivotally connected to each other, and a flexible wire is passed around the one end of each upper arm pivotally attached to the moveable frame, free ends of the flexible wires extending toward each other and being connected to each other via a common tension coil spring as set forth in claim 5, the two upper arms can be automatically balanced so as to form a same angle with respect to the moveable frame under the tension of the tension spring.

If the roll is floatingly supported so as to be moveable in a direction to extend the screen, and the blind device further comprises means for detecting a movement of the roll as set forth in claim 6, in case the moveable frame stops in the course of its movement, for instance, due to an interference by an obstacle, because the position of the roll changes due to the reduction in the tension of the screen, it is detected by the switch, and the electric motor can be stopped immediately. Therefore, the screen is prevented from being excessively paid out.

If a rolling member is provided in a part of the moveable frame which comes into contact with an automotive windshield as set forth in claim 7, a smooth operation of the blind device can be ensured. If each arm consists of a hollow pipe having an elongated cross section as set forth in claim 8, it is possible to maximize the rigidity and minimize the weight and the thickness all at the same time.

Now the present invention is described in the following in terms of its structure, operation and advantages with reference to the concrete embodiments illustrated in the appended drawings.

DETAILED DESCRIPTION OF THE PREFERRED EMBODIMENTS

Figure 1:
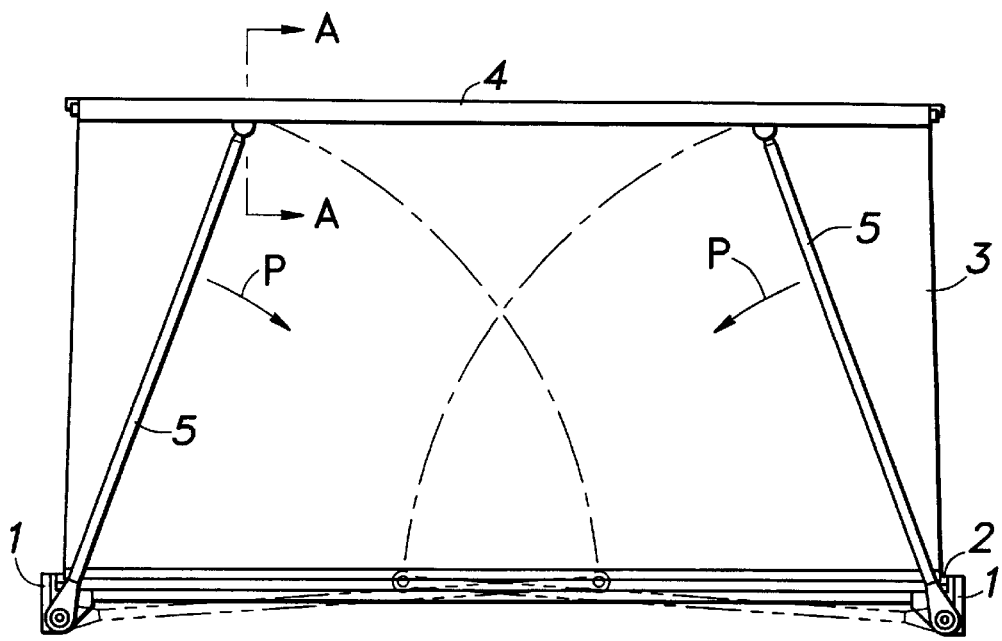
FIG. 1 is an overall front view of a blind device embodying the present invention.
Figure 2:
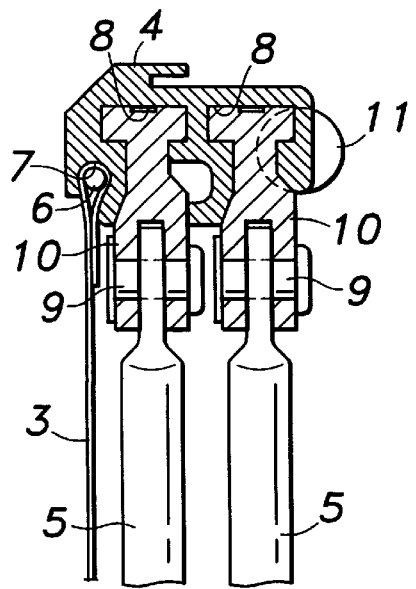
FIG. 2 is a sectional side view taken along line A—A of FIG. 1 showing the relationship between the arms and the moveable frame in an enlarged scale.

The blind device embodying the present invention illustrated in FIGS. 1 to 5 is applicable to automotive rear windshields, for instance, and comprises a roll 2 rotatably supported at both ends by a fixed frame 1, a screen 3 wound around the roll 2 in an extendable manner, a moveable frame 4 attached to a leading edge of the screen 3, and a pair of arms 5 each having one end pivotally attached to one side of the fixed frame 1 and another end slidably engaged by the moveable frame 4.

The upper end of the screen 3 wound around the roll 2 is firmly attached to the moveable frame 4 by fully winding the upper end of the screen 3 around a rod member 6, and fitting this rod member 6 into a groove 7 formed in the moveable frame 4.

The moveable frame 4 is provided with a pair of guide grooves 8 extending in parallel with each other, and engage slide shoes 10 which are pivotally attached to the other ends of the arms 5 via pins 9, respectively. A pair of rollers 11 are rotatably mounted on either side end of the moveable frame 4 for engagement with the inner surface of the automotive rear windshield (not shown in the drawings) so as to avoid direct interference between the moveable frame 4 and the rear windshield.

Figure 3:
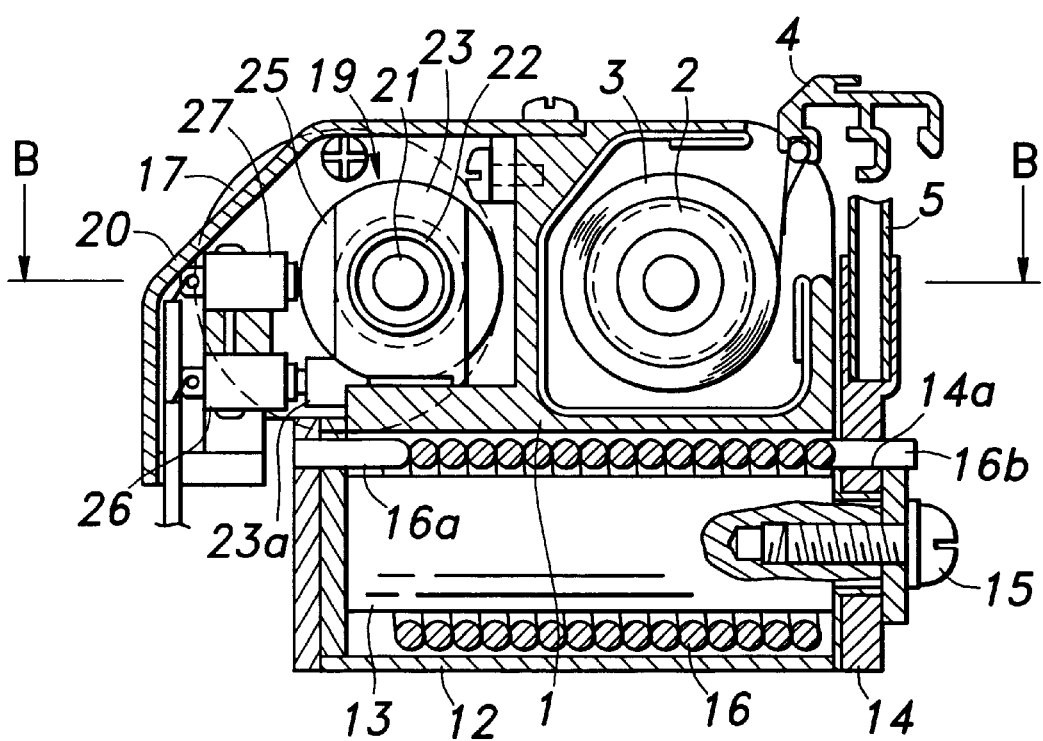
FIG. 3 is a sectional side view showing a part of the fixed frame of FIG. 1 in an enlarged scale.
Figure 4:
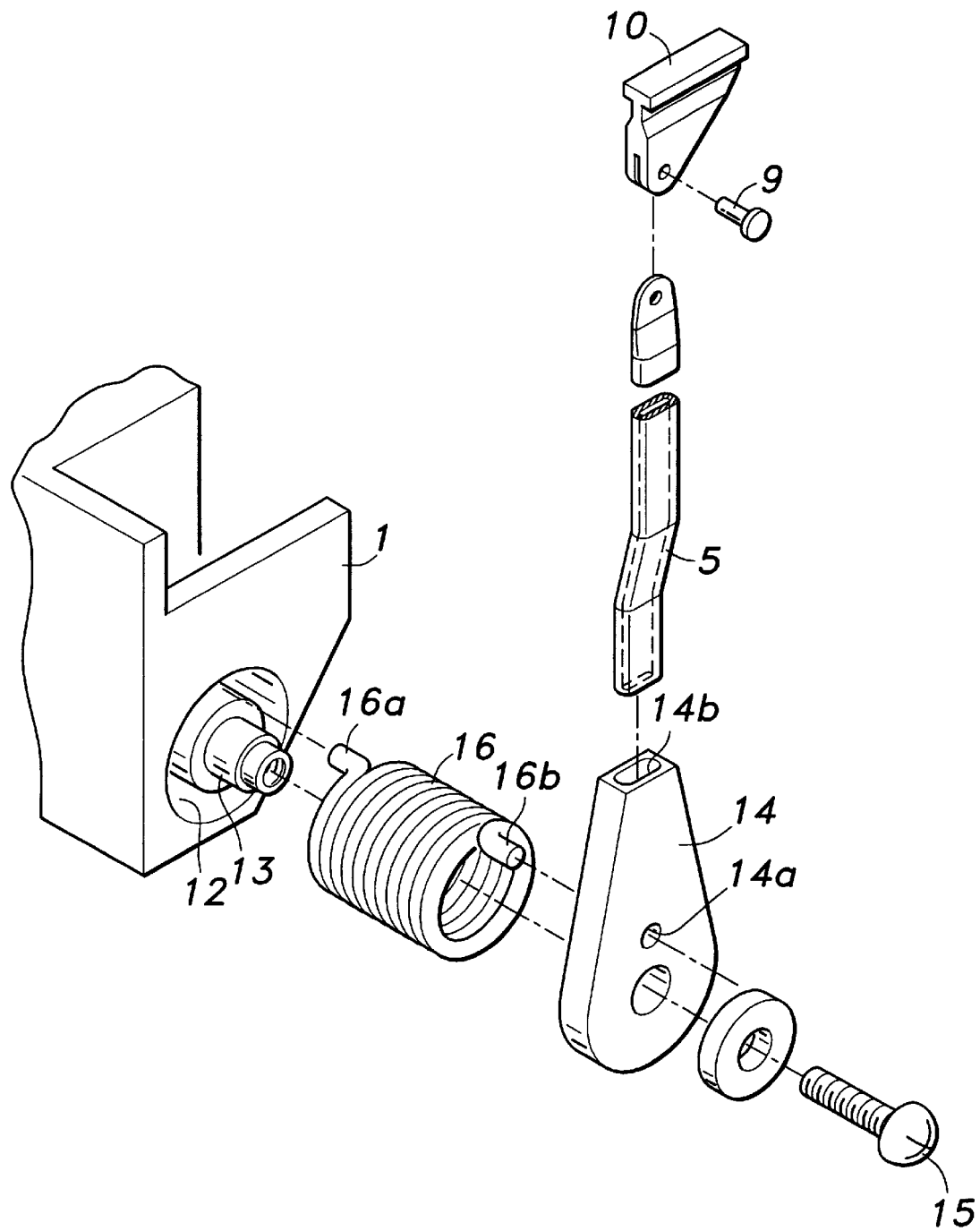
FIG. 4 is an exploded perspective view showing the relationship between one of the arms and the fixed frame.

A pair of cup-shaped spring cases 12 are fixedly attached to either side end of the fixed frame 1. A fixed shaft 13 projects centrally from a bottom wall of each spring case 12, and its free end projects from the open end of the corresponding spring case 12. An end of the corresponding arm 5 is pivotally attached to the free end of the fixed shaft 13 via an arm mounting member 14, and held in position by a threaded bolt 15. Each spring case 12 receives a torsion coil spring 16 surrounding the fixed shaft 13 as illustrated in FIGS. 3 and 4. The torsion coil spring 16 has a hook portion 16a which is engaged by the fixed frame 1 and another hook portion 16b which is engaged by an engagement hole 14a of the arm mounting member 14 so that the arm 5 is normally resiliently urged toward its upright position or in the direction to pull out the screen 3 via the arm mounting member 14.

Each of the arms 5 has a bent intermediate part as illustrated in FIG. 4 so that the free ends of the two arms are offset from each other in the fore-and-aft direction. As the free ends of the arms 5 are offset away from each other, the two arms 5 would not interfere with each other when they cross each other. In this embodiment, each of the arms 5 consists of a hollow pipe having a somewhat elongated cross section, and one end of the arm 5 is fitted into an elliptic hole 14b defined in the corresponding arm mounting member 14. The arm 5 may also be integrally formed with the corresponding arm mounting member 14.

Figure 5:
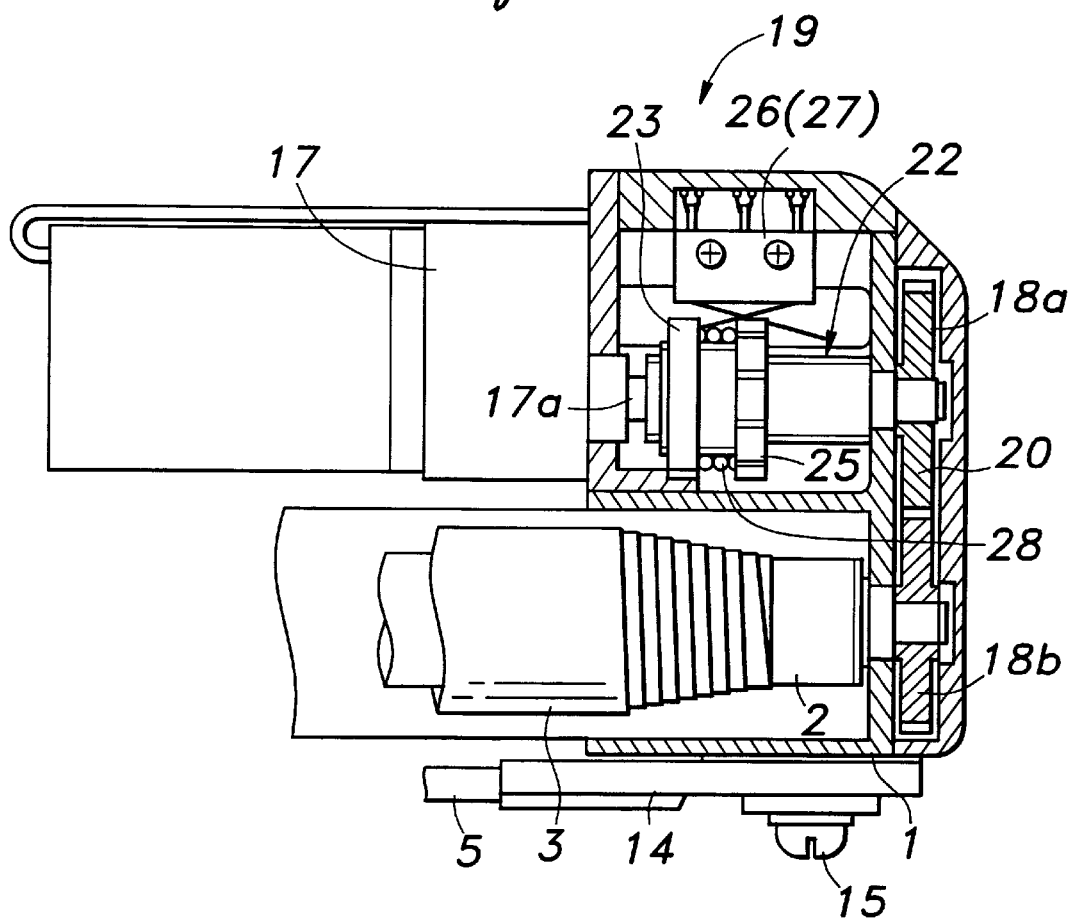
FIG. 5 is a sectional plan view taken along line B—B of FIG. 3.

Referring to FIG. 5, the roll 2 is connected to an output shaft 17a of an electric motor 17 incorporated with a speed reduction gear unit via a pair of gears 18a and 18b so as to be turned in either direction by turning the electric motor 17 in the corresponding direction.

Figure 6:
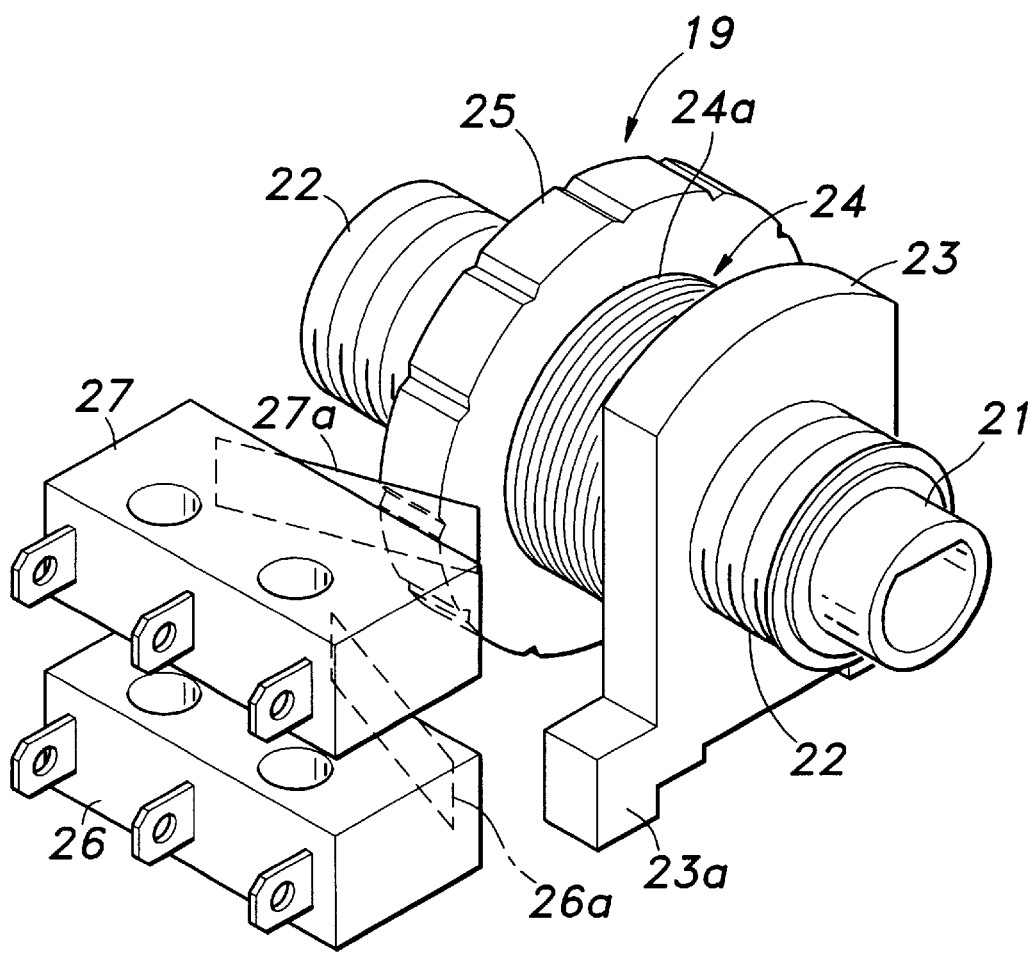
FIG. 6 is a simplified perspective view of an essential part of the switch mechanism.

A switch box 20 accommodating a switch mechanism 19 is provided in a part of the fixed frame 1 adjacent to the mounting portion of the electric motor 17. As illustrated in FIG. 6, this switch mechanism 19 comprises a hollow rotary shaft 21 connected to the output shaft 17a of the electric motor 17, an axially moveable member 23 consisting of a plate member threadably engaging the male thread section 22 formed on the rotary shaft 21, and a thread tube member 24 which is fixedly attached to the axially moveable member 23 so as to surround the male thread section 22 and provided with another male thread section 24a serving as axial adjustment means on its outer circumference.

An annular striker 25 having a knurled outer circumference is threadably engaged by the male thread section 24a of the thread tube member 24. A free end of an actuating piece 26a of a first switch 26 consisting of a micro switch opposes a projecting piece 23a provided in the axially moveable member 23, and a free end of an actuating piece 27a of a second switch 27 likewise consisting of a micro switch opposes the striker 25. A compression coil spring 28 is interposed between the axially moveable member 23 and the striker 25 in a compressed state as illustrated in FIG. 5 so that a play that may exist in the thread engagement due to errors in the thread machining may be eliminated. A part of the projecting piece 23a of the axially moveable member 23 is received in a horizontal groove formed in the switch box 20 so that the axially moveable member 23 is kept rotationally fast and moveable only in the axial direction.

According to the above described blind device, when an operation switch not shown in the drawings is turned on to activate the blind device from the state where the screen 3 is closed as illustrated in FIG. 1, electric current is supplied to the electric motor 17 via closed contacts of the first and second switches 26 and 27 in the direction to turn the roll 2 so as to wind the screen thereon. As the screen 3 is thus wound on the roll 2, the moveable frame 4 is subjected to a downward force. This produces a laterally directed component to each of the slide shoes 10, and as the winding force produced from the electric motor 17 overcomes the spring force of the torsion coil springs 16, the slide shoes 10 start moving along the guide grooves 8 toward the center thereof. Thus, as the screen 3 is wound on the winding roll 2, the arms 5 are turned in the directions indicated by the arrows P in FIG. 1 against the biasing force of the torsion coil springs 16.

Meanwhile, the rotation of the male thread section 22 caused by the rotation of the electric motor 17 drives the axially moveable member 23 along the male thread section 22. Once the screen 3 is wound on the roll 2 (opened) to a prescribed extent, the projecting piece 23*a* of the axially moveable member 23 presses the actuating piece 26*a* of the first switch 26, and this interrupts the supply of electric current to the electric motor 17, thereby stopping the rotation of the roll 2. When the motor 17 is thus brought to a stop, the biasing force of the torsion coil springs 16 acts in the direction to pull out the screen 3. However, because the reduction ratio of the electric motor 17 is selected in such a manner that a reverse drive is not possible, the screen 3 can be kept stationary at the position where the electric motor 17 came to a stop.

When it is desired to close the screen 3, electric current is supplied to the electric motor 17 via a closed contact set of the second switch 27 by using a circuit (not shown in the drawings) bypassing the first switch 26. This causes the electric motor 17 to turn in the reverse direction or in the direction to pay out the screen 3 so that the arms 5 turn toward their upright positions under the spring force of the torsion coil springs 16. As a result, the slide shoes 10 move outward along the guide grooves 8, and the resulting upward movement of the fixed frame 4 pulls out the screen 3 from the roll 2 without producing any slack. As the male thread section 22 turns in the reverse direction due to the reverse rotation of the electric motor 17, the striker 25 which moves axially jointly with the axially moveable member 23 presses the actuating piece 27*a* of the second switch 27, and interrupts the supply of electric current to the electric motor 17. As a result, the screen 3 ceases to be paid out, and the screen 3 is kept stationary at that position.

Because the striker 25 threadably engages the male thread section 24*a* of the thread tubular member 24, jointly with the axially moveable member 23, the extending length of the screen 3 can be readily adapted to the vertical dimension of the windshield by adjusting the distance between the striker 25 and the axially moveable member 23.

Figure 7:
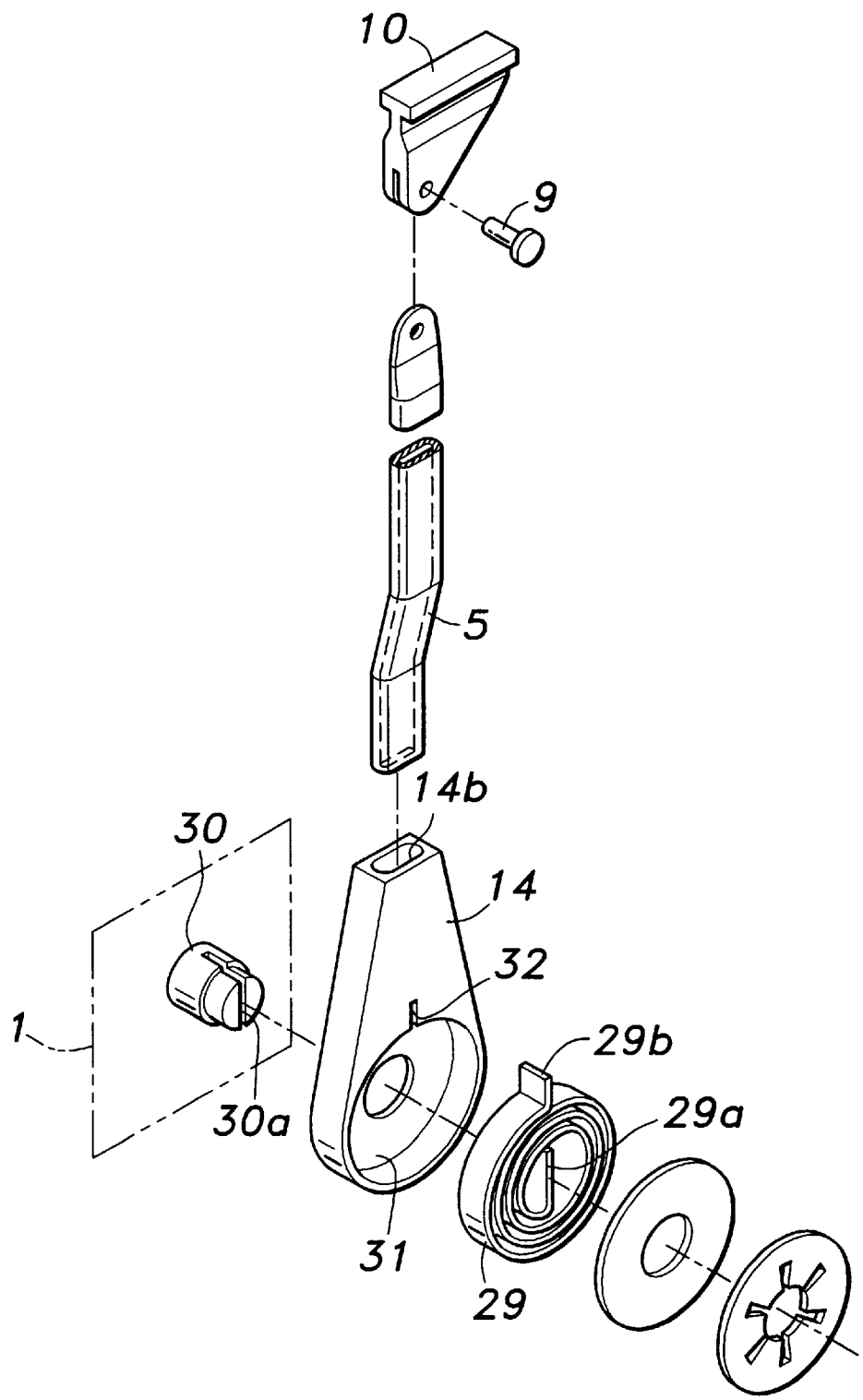
FIG. 7 is an exploded perspective view showing another embodiment of the arm mounting member in relation with the fixed frame.
Figure 8:
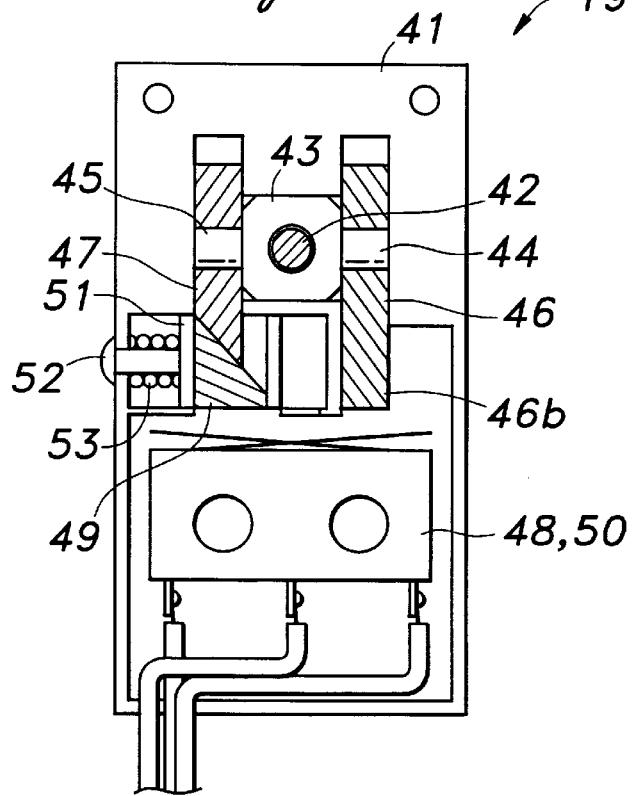
FIG. 8 is a partly broken away front view of another embodiment of the switch mechanism.
Figure 9:
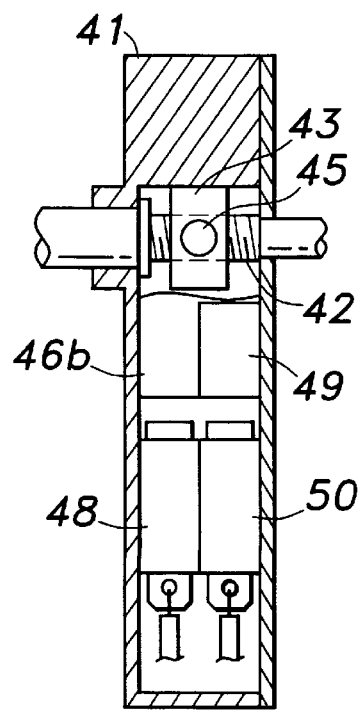
FIG. 9 is a sectional side view of the switch mechanism shown in FIG. 8.
Figure 10:
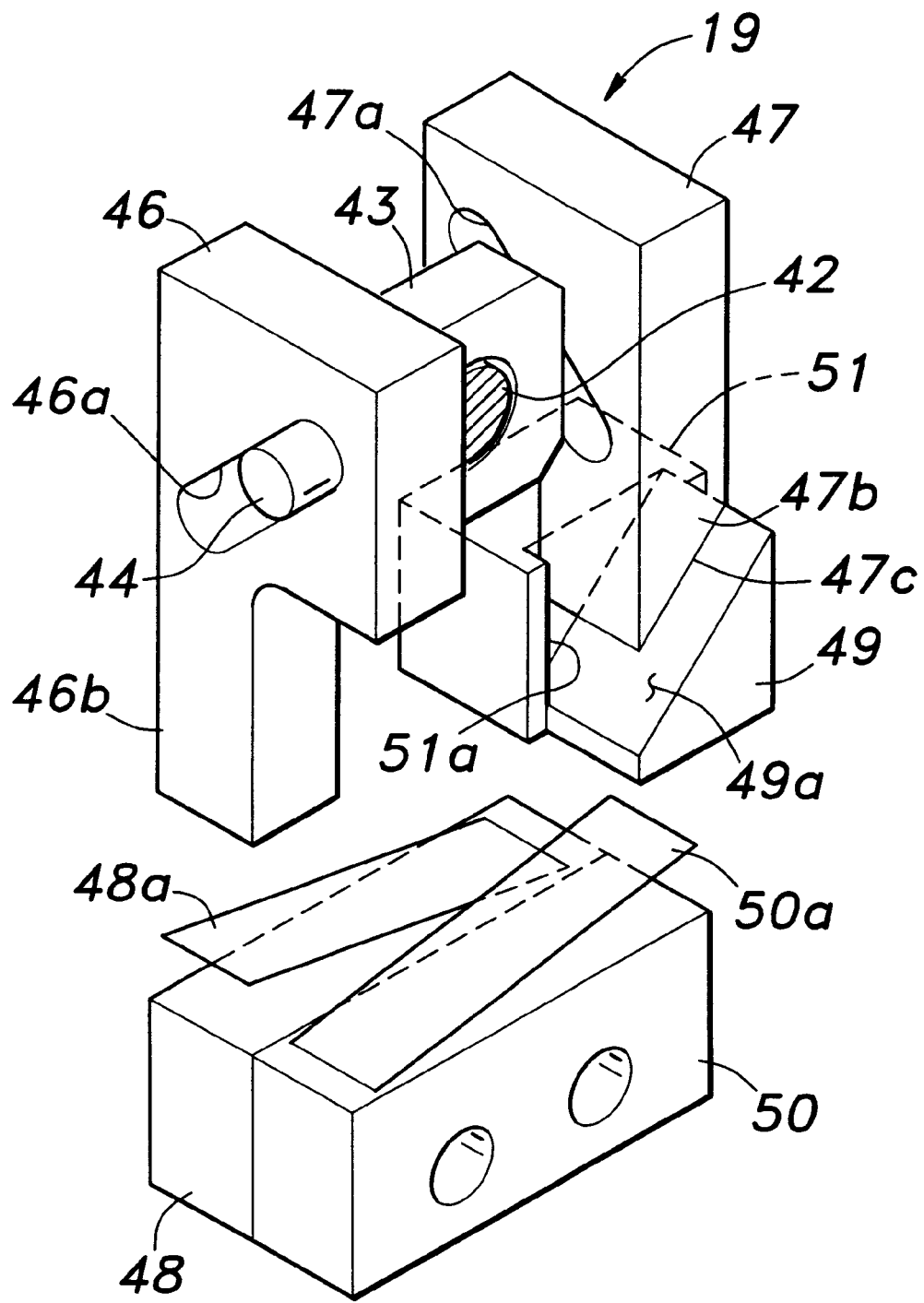
FIGS. 10 and 11 are simplified perspective views of the switch mechanism shown in FIG. 8.
Figure 11:
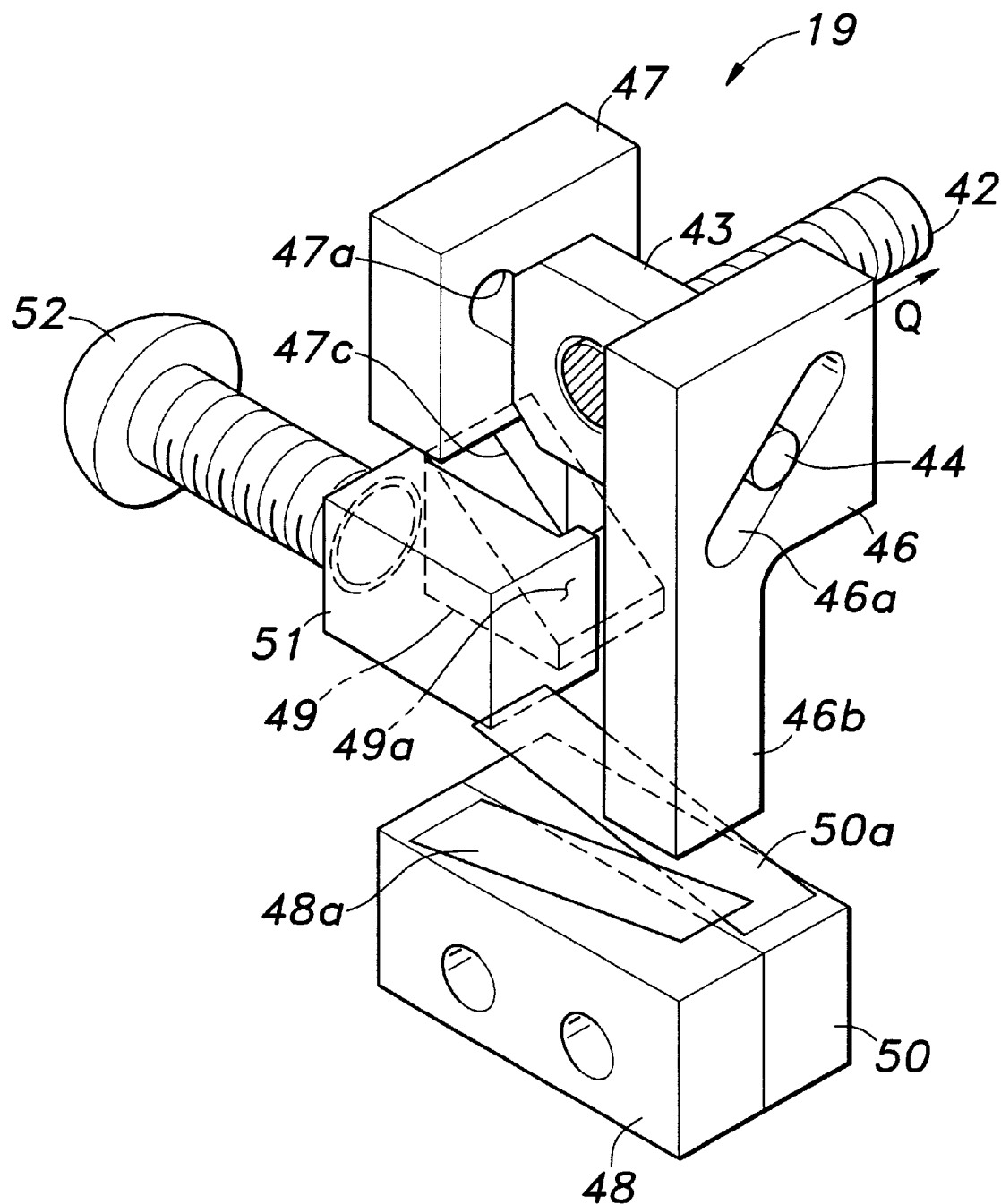

A similar result can be obtained by using a spiral spring 29 as illustrated in FIG. 7, in place of the torsion coil spring 16 described above. In this case, a fixed shaft 30 having a slit 30*a* projects from the fixed frame 1, and a spring case 31 is formed in the arm mounting member 14. The spring case 31 is fitted onto the fixed shaft 30 so as to support the arm mounting member 14 in a rotatable manner. The spiral spring 29 is received inside the spring case 31, and one of the hook portions 29*a* thereof is engaged by a slit 30*a* in the fixed shaft 30 while the other hook portion 29*b* is engaged by a slit 32 formed in the arm mounting member 14 so that the arm 5 is resiliently urged in the direction to pull out the screen via the arm mounting member 14.

Another embodiment of the switch mechanism 19 is described in the following with reference to FIGS. 8 to 11. This embodiment differs from the first embodiment in the internal structure of the switch box. A male thread shaft 42 which is connected to a similar electric motor incorporated with a speed reduction gear unit is introduced centrally into an upper part of the switch box 41, and a rectangular slider 43 threadably engages this male thread shaft 42.

The two opposite sides of the slider are provided with guide pins 44 and 45 projecting therefrom, and these guide pins are received in slots 46*a* and 47*a* formed in first and second moveable plates 46 and 47, respectively, so as to extend obliquely and across each other.

The lower end of the projecting piece 46*b* projecting from a lower part of the first moveable plate 46 is disposed adjacent to the actuating piece 48*a* of the first switch 48, and the lower end of the projecting piece 47*b* projecting from a lower part of the second moveable plate 47 is disposed adjacent to the actuating piece 50*a* of the second switch 50 via an adjustment block 49.

The adjustment block 49 is provided with an inclined surface 49*a* which engages a corresponding inclined surface 47*c* on the lower end of the second moveable plate 47, and a lower surface which directly engages the actuating piece 50*a* of the second switch 50.

A side part of the adjustment block 49 is retained in a recess 51*a* formed in the guide member 51. An adjustment screw 52 is passed through a side wall of the switch box 41, and is threaded into the guide member 51. Thus, by turning this adjustment screw 52, it is possible to move the guide member 51 via the adjustment block 49 in such a manner that the vertical stroke of the second moveable plate 47 or the operating point of the actuating piece 50*a* of the second switch 50 may be adjusted.

A compression coil spring 53 is interposed between the head of the adjustment screw 52 and the guide member 51 in a compressed state so that a play in the thread engagement between them may be removed.

According to this embodiment, as the male thread shaft 42 turns by the rotation of the electric motor 17, the slide 43 moves along the male thread shaft 42 in the direction indicated by arrow Q so that the slot 46*a* is pushed down by one of the guide pins 44 and the first moveable plate 46 thereby moves downward. When the screen 3 has been wound to a prescribed extent, the projecting piece 46*b* presses the actuating piece 48*a* of the first switch 48. At this time, the other pin 45 pushes the slot 47*a* upward, and the second moveable plate 47 thereby moves upward.

As a result, the electric motor 17 stops, and the screen 3 is kept open by being kept wound on the roll 2.

When it is desired to pull up the screen 3, the electric motor 17 is turned in the reverse direction. This causes the other guide pin 45 to push down the slot 47*a*, thereby lowering the second moveable plate 47, and the one guide pin 44 to push up the slot 46*a*, thereby raising the first moveable plate 46. As a result, the second moveable plate 47 presses the actuating piece 50*a* of the second switch 50 via the adjustment block 49 so that the electric motor 17 comes to a stop and the closed state of the screen 3 is maintained.

In this case, by turning the adjustment screw 52, the relative position between the inclined surface 49*a* of the adjustment block 49 and the inclined surface 47*c* of the second moveable plate 47 via the guide member 51 can be changed, and it allows the operating timing of the actuating piece 50*a* by the adjustment block 49 or the extending length of the screen for closing the window to be adjusted at will. Thus, the blind device can be adapted to different sizes of the window.

Figure 12:
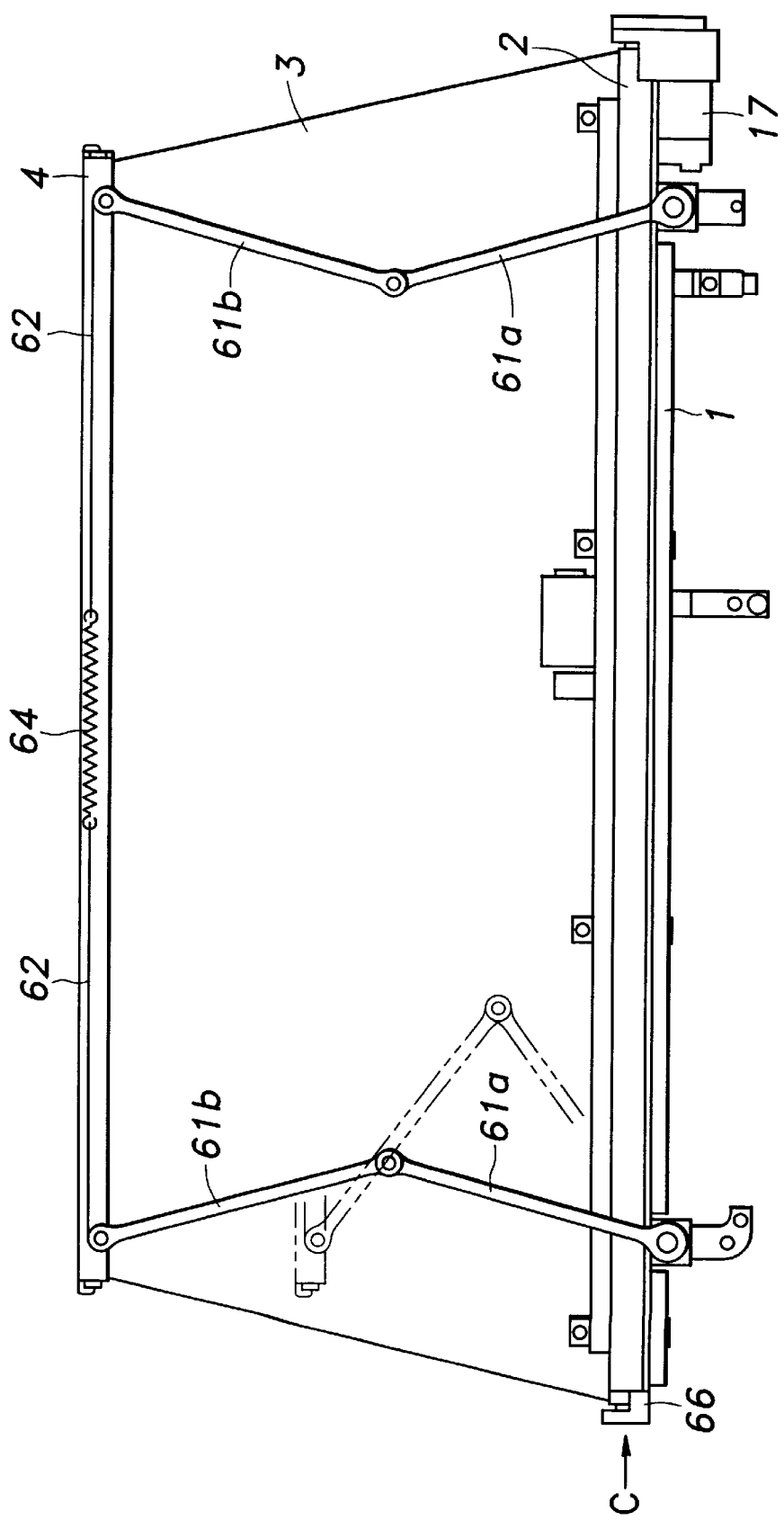
FIG. 12 is an overall front view of a second embodiment of the blind device according to the present invention.

Now is described the second embodiment of the blind device according to the present invention with reference to FIG. 12. This embodiment comprises a pair of arms, and each of the arms comprises a lower arm 61*a* and an upper arm 61*b* which are pivotally connected to each other at their one ends. The other end of the lower arm 61*a* is pivotally attached to a fixed frame 1, and the other end of the upper arm 61*b* is pivotally attached to a moveable frame 4. Thus, the moveable frame 4 is allowed to move toward and away from the fixed frame 1 by changing the flexing angle of each of the arms consisting of a lower arm 61*a* and an upper arm 61*b*.

The end of each lower arm 61*a* which is pivotally attached to the fixed frame 1 is incorporated with a torsion coil spring 16 (or a spiral spring 29) similar to that of the first embodiment described above so that the lower arm 61a is normally resiliently urged toward its upright position.

Figure 13:
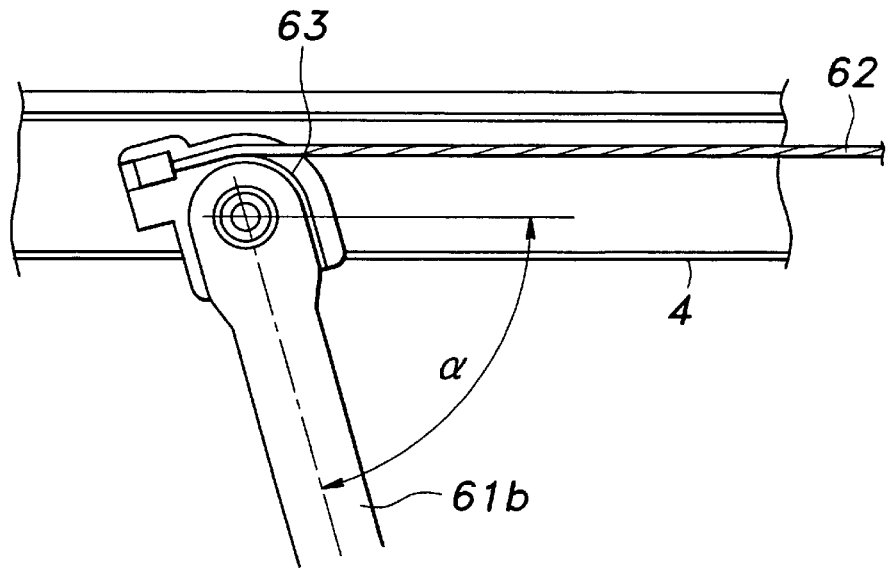
FIG. 13 is a front view of an essential part showing the relationship between one of the arms and the moveable frame of the blind device of FIG. 12 in an enlarged scale.

The end of each upper arm 61b which is pivotally attached to the moveable frame 4 is provided with a partial sheave 63, and a flexible wire 62 is passed around this sheave 63 approximately over a quarter of its circumference as illustrated in FIG. 13. One end of the flexible wire 62 is connected to an outer side of the corresponding upper arm 61b, and the other end thereof extends along the length of the moveable frame 4 toward the other flexible wire 62. The opposing ends of the two flexible wires are connected to each other via a tension coil spring 64.

Thus, when the screen 3 is fully extended, the angle α between the moveable frame 4 and each upper arm 61b is maximized, the tension coil spring 64 is least extended. When the screen 3 is wound onto the roll 2 from this state, the moveable frame 4 is progressively lowered, and the angle α gradually diminishes. At the same time, the wrapping angle of the flexible wire 62 over the partial sheave 63 increases, and the tension coil spring 64 extends. It means that a moment which tends to increase the angle between the upper arm 61b and the moveable frame 4 is normally applied around the pivot shaft. Furthermore, because the moments acting on the two upper arms 61b are produced by a common tension coil spring 64, the angles of the two upper arms 61b with respect to the moveable frame 4 are balanced, and kept equal to each other. Therefore, the moveable frame 4 always moves vertically while maintaining a parallel relationship to the fixed frame 1. Therefore, no uneven slack is produced in the screen 3.

Figure 14:
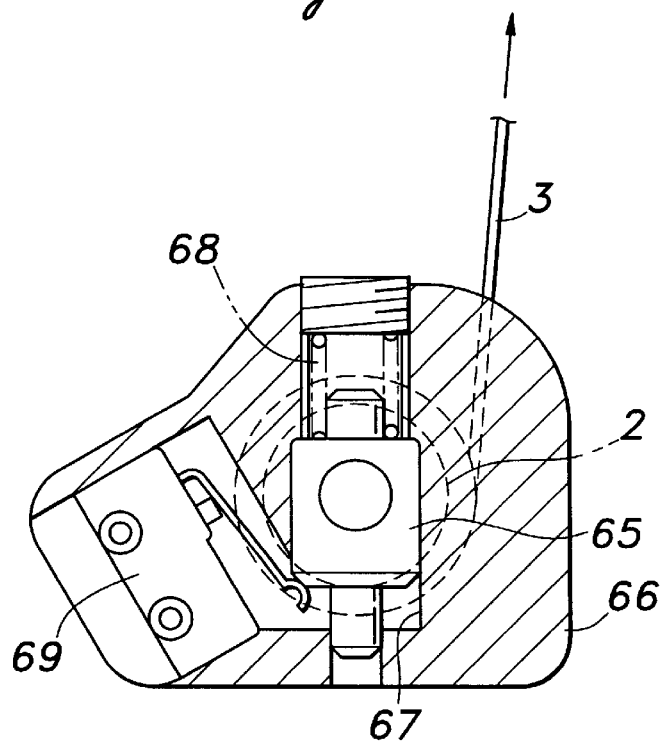
FIG. 14 is a fragmentary sectional side view of the fixed frame as seen from the direction indicated by arrow C in FIG. 12.

The action of paying out the screen 3 by the electric motor 17 is not coordinated with the rising movement of the lower arm 61a under the spring force of the torsion coil spring 16. Therefore, when the moveable frame 4 is prevented from moving during its course of motion by abutting an obstacle, the electric motor 17 would continue to turn, and the screen 3 could be excessively paid out. Therefore, according to the present invention, as shown in FIG. 14, a bearing 65 of the roll 2 on the side remote from the electric motor is engaged by a side plate 66 of the fixed frame 1 via a slot 67 so as to accommodate a vertical movement thereof to a certain extent, and is resiliently urged downward by a compression coil spring 68. Thus, each lower arm 61a is normally resiliently urged toward its upright condition, and a certain tension is normally applied to the screen 3 due to the upward force applied to the moveable frame 4, but, when the upward movement of the moveable frame 4 has come to a stop, and a slack is created in the screen 3, the bearing 65 moves downward under the spring force of the compression coil spring 68, causing a contact set of a micro switch 69 incorporated in the bearing assembly to close, and the supply of electric current to the electric motor 17 to be thereby interrupted. Thus, the screen 3 is prevented from being excessively paid out.

Industrial Applicability

The device of the present invention is not only suited as blind devices for a windshield of a vehicle or a window of a building for controlling the amount of sunlight introduced into a passenger compartment or a room but also as simple partition walls and cinema screens.

What is claim is:

1. A blind device comprising a fixed frame, at least a pair of arms each having an end pivotally attached to the fixed frame, a moveable frame which is adapted to move toward and away from the fixed frame in a parallel relationship by rotational movements of the two arms, and a light-shielding screen having one end fixedly attached to and wound around a roll which is rotatable supported by the fixed frame, and another end fixedly attached to the moveable frame, characterized by that:

a pivot shaft for pivotally supporting each arm on the fixed frame is incorporated with a spring which resiliently urges the corresponding arm toward its upright position, and another end of each of the arms is slidably engaged by the moveable frame, the blind device further comprising an electric actuator having reverse drive preventing means for applying a rotative force to the roll so as to wind the screen thereon against a spring force of the spring, further comprising a male thread shaft which is rotatable jointly with a rotary shaft of the electric actuator, an axially moveable member having rotation preventing means for keeping the axially moveable member rotationally fast, and threadably engaging the male thread shaft, and switch means for detecting a displacement of the axially moveable member along the male thread shaft, wherein a striker for actuating the switch means is attached to the axially moveable member via axial distance adjusting means, and wherein a second spring is interposed between the axially moveable member and the striker to urge them in a prescribed direction.

2. A blind device comprising a fixed frame, at least a pair of arms each having an end pivotally attached to the fixed frame, a moveable frame which is adapted to move toward and away from the fixed frame in a parallel relationship by rotational movements of the two arms, and a light-shielding screen having one end fixedly attached to and wound around a roll which is rotatably supported by the fixed frame, characterized by that;

a pivot shaft for pivotally supporting each arm on the fixed frame is incorporated with a spring which resiliently urges the corresponding arm toward its upright position, the blind device further comprising an electric actuator having reverse drive preventing means for applying a rotative force to the roll so as to wind the screen thereon against a spring force of the spring, each of the two arms comprising a lower arm having one end pivotally attached to the fixed frame, and an upper arm having one end pivotally attached to the moveable frame, other ends of the lower and upper arms being pivotally connected to each other, two flexible wires, each flexible wire being passed around the one end of a corresponding upper arm pivotally attached to the moveable frame, free ends of the flexible wires extending toward each other and being connected to each other via a common tension coil spring.

3. A blind device according to claim 2, wherein the roll is floatingly supported so as to be moveable in a direction to extend the screen, and the blind device further comprises means for detecting a movement of the roll.

4. A blind device according to claim 2, wherein a rolling member is provided in a part of the moveable frame which comes into contact with an automotive windshield.

5. A blind device according to claim 2, wherein each arm consists of a hollow pipe having an elongated cross section.

6. A blind device comprising a fixed frame, at least a pair of arms each having an end pivotally attached to the fixed frame, a moveable frame which is adapted to move toward and away from the fixed frame in a parallel relationship by rotational movements of the two arms, and a light-shielding screen having one end fixedly attached to and wound around a roll which is rotatable supported by the fixed frame, and another end fixedly attached to the moveable frame, characterized by that;

a pivot shaft for pivotally supporting each arm on the fixed frame is incorporated with a spring which resiliently urges the corresponding arm toward its upright position, and another end of each of the arms is slidably engaged by the moveable frame, the blind device further comprising an electric actuator having reverse drive preventing means for applying a rotative force to the roll so as to wind the screen thereon against a spring force of the spring, wherein the roll is floatingly supported so as to be moveable in a direction to extend the screen, and the blind device further comprises means for detecting a movement of the roll.

\* \* \* \* \*

UNITED STATES PATENT AND TRADEMARK OFFICE
CERTIFICATE OF CORRECTION

PATENT NO : 6,135,192
DATED : OCTOBER 24, 2000
INVENTOR(S): KEN SUZUKI; MASARU INOUE; ICHIRO SASUGA

It is certified that error appears in the above-identified patent and that said Letters Patent is hereby corrected as shown below:

On the cover page:

"[86] PCT No.: PCT/JP90/00141" should read

--[86] PCT No.: PCT/JP98/00141--.

Signed and Sealed this

Eighth Day of May, 2001

Attest:

NICHOLAS P. GODICI

*Attesting Officer*    *Acting Director of the United States Patent and Trademark Office*